//patents.google.com/patent/US3433358

United States Patent Office 3,433,358
Patented Mar. 18, 1969

3,433,358
METHOD OF SEPARATING SUSPENDED UN-SUPPORTED NOBLE METAL CATALYSTS FROM HYDROGENATED LIQUIDS
Hans Herzog, Bensheim-Auerbach, and Gerhard Kabisch, Rheinfelden, Baden, Germany, assignors to Deutsche Gold- und Silber-Scheideanstalt vormals Roessler, Frankfurt am Main, Germany
No Drawing. Filed Dec. 2, 1966, Ser. No. 598,591
Claims priority, application Germany, Dec. 4, 1965, D 48,828
U.S. Cl. 210—65  6 Claims
Int. Cl. B01d 27/04, 39/16

ABSTRACT OF THE DISCLOSURE

A method of separating suspended unsupported finely divided noble metal catalysts from organic liquids, especially, hydrogenated organic liquids, by filtration through a porous carbon filter.

---

Reference is made to our copending application entitled "Process For Carrying Out Catalytic Hydrogenation Reactions in the Presence of Suspension Catalysts," Ser. No. 598,716, filed of an even date herewith which contains related disclosures.

The present invention concerns the separation of suspended noble metal catalysts from hydrogenated liquids and more particularly concerns the separation thereof with the aid of porous carbon filters.

It is known that various types of catalysts may be employed for hydrogenations, especially, those carried out at low pressures. Examples of such catalysts are: fixed bed supported catalysts, suspended supported catalysts, Raney catalysts and unsupported noble metal suspended catalysts. However, such catalysts often are subject to considerable disadvantages in view of their special properties. In fixed bed or supported catalysts of palladium on aluminum oxide, despite their large active surface areas and the good activity engendered thereby, the low selectivity, as uncontrollable reactions can occur in the interior pores of the material, often is of disadvantage. However, when the surface area of the carrier employed is kept small, even though a greater selectivity may be achieved, this is at the cost of the catalyst activity. A further disadvantage, especially in fixed bed catalysts resides in that their activity during the course of their use decreases because of aging and especially because of poisoning or incursions of water. Although there are possibilities for regeneration, the activity of the catalyst does change during continued use, so that the reaction conditions for the hydrogenation must be adjusted for the condition of activity at hand. This, however, especially in continuous processes, is troublesome and often impossible. Furthermore, total reprocessing of spent catalysts can be rather costly, especially with supported catalysts.

Raney catalysts also have the disadvantage of poor selectivity, which has been indicated to be overcome in a number of processes by special prepoisoning of the catalyst. In this instance, again, the improvement in selectivity gained is at the cost of the catalytic activity and also of the life of the catalyst. Raney catalysts in general are not regeneratable and therefore when their activity diminishes they are practically worthless.

These disadvantages of the known catalysts can be avoided to a far-reaching degree, if the hydrogenation of organic compounds is carried out with pure metallic noble metal catalysts such as platinum black or, especially, palladium black. Such catalysts are easy to produce and process. In view of their high activity they are effective even in small concentrations and furthermore in view of their selectivity they also may be used without prepoisoning and therefore can be employed at their full activity. In addition, they are to a far-reaching degree free of inner pores, so that, the occurrence of side reactions or selective adsorption phenomena are substantially precluded. In general, such pure metallic noble metal catalysts are easy to suspend and can therefore be easily conveyed in the reaction medium by pumps or other means.

In view of these advantages, noble metal catalysts have already achieved extensive use in the chemical industry. However, it has not been possible to introduce them for use on a commercial scale in larger plant operations as the separation of the suspended catalyst from the liquid reaction mixture causes considerable difficulties. The noble metal catalysts, as can be ascertained by electron microscope, have particles of about 0.5 m$\mu$ which are composed of a large number of primary particles whose diameter is of the order of 0.01 m$\mu$.

Suspensions of noble metal catalysts in organic liquids of a density of 0.9 and a viscosity of 5 cp. at 20° C. remain unchanged for days. Centrifugal separation is only possible with the highest speeds. The high consumption of current alone would render such separation uneconomical. The consequences of the centrifuging on the structure of the metal separated are even more serious, as during the separation a ductile noble metal sheet is formed from the suspension catalyst. Such centrifugal separation would therefore require continuous processing of such sheet to the noble metal black.

Filtartion on horizontal or vertical plate filters or filter presses also cannot be carried out economically. The high value of the noble metal requires the presence thereof in the hydrogenation recycle and not on the filter plates. In addition, a highly effective filter aid has to be used for the fine filtration required. The noble metal black therefore not only is collected on the filter surfaces after a short period of time but also is collected thereon in admixture with the filter aid. In this instance also it would be necessary to effect continuous processing and recovery of the relatively large proportion of the noble metal catalyst collected on the filter.

The results of the tests which are tabulated below evidence the superiority of a palladium black catalyst over other catalyst types and the significance of the nonsupported noble metal catalysts for commercial hydrogenations.

In each of such tests a solution of 2.4 g. of styrene oxide in 80 ml. of isopropanol was hydrogenated in a stirring apparatus at a temperature of 35° C. with the suspension catalyst in question. As an indication of the catalyst activity, the quantity of catalyst required to effect a 50 ml. hydrogen take up between the second and third minute was determined and compared.

| Catalyst type: | Quantity required for a 50 ml./min. $H_2$ take up, g. |
|---|---|
| Palladium black | 0.04 |
| Unpoisoned Raney nickel | 4.66 |
| Raney nickel poisoned with Na-formate | 13.25 |
| 2% Pd on dolomite of a particle size of 1–2 mm. | 21.30 |

In the production of hydrogen peroxide by the so-called anthraquinone process, during the hydrogenation of, for example, ethyl anthraquinone, a side reaction occurs which involves hydrogenation of the aromatic nucleus and finally leads to tetrahydroanthraquinone. In commercial applications of this process the reduction of this side reaction and the dehydrogenation of the resulting tetra derivative are of special significance.

As can be seen from the following tabulation, this tetra derivative formation is dependent to a great degree upon the type of catalyst employed. The selectivity of a catalyst can be measured by comparing the velocity of the hydrogen takeup in the main reaction (anthahydroquinone formation) with the velocity of the hydrogen takeup after the main reaction has been completed. A 2-ethyl anthraquinone solution was hydrogenated in the tests concerned with the various quantities of the catalysts tested in such a manner that the main reaction (at a hydrogen takeup of 50 ml./min.) was ended in 9 minutes. Thereafter the hydrogenation was followed for 3 hours. When the velocity of the hydrogen takeup in the side reaction is taken as 1 the ratio given in the following indicates how many times faster the main reaction occurred.

| Catalyst type: | Ratio of main reaction:side reaction |
| --- | --- |
| Palladium black | 175:1 |
| Palladium on dolomite | 66:1 |
| Raney nickel (Unpoisoned) | 11:1 |
| Raney nickel poisoned with Na-formate | 40:1 |

According to the invention, it was found that the difficulties encountered in the normal methods for separation of the unsupported noble metal catalysts from their suspensions in organic liquids could be avoided by employing a porous carbon filter which has relatively coarse pores in comparison to the primary particle size of the catalyst. It was found that through the use of such filters, the finely divided noble metal catalyst could be filtered off quantitatively while also maintaining its activity and structure.

The size of the pores of the carbon filter can be substantially larger than the average particle size of the catalyst, for example, with an average particle size of about 1 m$\mu$ the pore diameter should at most be 15 m$\mu$. However, such a carbon filter will also still separate particles of a size of about 0.01 m$\mu$ with good success.

Expediently the porous carbon filter material is used in the form of filter candles in order to provide as large a filter surface in the filtration space. The free pore volume of such carbon filter candles should be at least 15% and preferably at least 30%. In order to provide sufficient mechanical stability, the thickness of the filter wall should not be less than 10 mm.

Carbon itself or coke, especially, petroleum coke, may serve as the base for the porous carbon filters according to the invention. Such carbon material is shaped with the aid of organic binders such as tar oils or synthetic resins and baked. The resulting porous masses in addition to being used, as preferred, in the form of filter candles, can also, for instance, be used in the form of filter-plates, -rings, -bricks and -cylinders.

It has unexpectedly been found that even after 4 years of use of porous carbon filter candles according to the invention the presence of noble metal could not be detected analytically in the deeper layers of such candles. By turning the candles on a lathe in 0.5 mm. steps, it was found that the noble metal was only present in the outermost layer. Therefore, practically a surface filtration occurs which proceeds without use of a filter aid. As long as the porous carbon filters according to the invention are backwashed, for instance, for about 3 to 10 seconds at intervals which are not too far apart, for example, about 20 to 30 minutes, such filters can be used for periods of at least 4 years practically without reduction in filtration efficiency. Even though the pressure loads during filtration and backwashing present considerable demands on the strength and the elasticity of the carbon filters employed according to the invention, it was found that even in this category the carbon filters were substantially superior to sintered metallic or ceramic materials. Even after years of use no limit has yet been found for the life of the carbon filters employed according to the invention. In addition, during such use the noble metal black remained practically unchanged as to its structure and activity.

Whereas, in general, incursions of free water have a very unfavorable effect on the activity of suspended noble metal catalysts as they lead to coagulation of the catalyst particles at the filters previously employed because of accumulation of nondissolved water at the filter, this phenomena does not occur with the organic carbon filters employed according to the invention, as the free water passes through the filter without, as in the case of ceramic or metal filters, causing wetting of the filter which promotes a coagulation of the suspended catalyst considerably.

The porous carbon filters which are employed according to the invention to separate off suspended catalysts can be used with success in hydrogenation reactions of all types. The invention, however, has special significance in the cyclic process for the production of hydrogen peroxide by the hydrogenation and subsequent oxidation of anthraquinone. After hydrogenation of the dissolved anthraquinone derivative with hydrogen on the catalyst during which the corresponding anthrahydroquinone derivative is primarily produced, the hydrogenation catalyst must be completely removed in a second step as otherwise the hydrogen peroxide would be decomposed catalytically in the following oxidation and extraction steps.

The use of the carbon filter according to the invention for filtering off the suspension catalyst used for the hydrogenation in the first step of the cyclic anthraquinone process provides for a considerable improvement in such process as it renders it possible to employ unsupported noble metal suspension catalysts upon a commercial scale and to separate them off quantitatively after the hydrogenation step. It is possible therefore to make the high activity and selectivity of the noble metal suspension catalysts economically available for the anthraquinone process.

The invention is further illustrated by the following examples.

EXAMPLE 1

The filter efficiency of porous carbon filter candles of a length of 50 cm., an outer diameter of 7 cm. and a wall thickness of 1.5 cm. were tested in a technical institution in an endurance test. The porous carbon filter candles were produced from petroleum coke which was shaped with the aid of tar oil as binding agent and baked. The maximum pore size of such filter candles was 15 m$\mu$ and the free pore volume was about 30%. The model solution to be filtered ($D_4^{20}=0.96$, viscosity at 20° C.=3.1 cp.) was a mixture of about 75 vol. percent of aromatic gasoline (gasoline produced by an aromatization, such as, by platforming of aliphatic hydrocarbons, for instance, decane, which upon platforming is primarily converted to tetramethyl benzene) and 25 vol. percent of trioctyl phosphate, in which 120 g./liter of palladium black of a particle size between 0.01 and 1 m$\mu$ were suspended. Three filter candles were combined to a filter unit which had a filter area of 3,300 cm.$^2$. Three of such units with a total filter area of 1 m.$^2$ were provided in the filter apparatus. During a test period of 3 years, 750 liters/h. of an absolutely solid free (catalyst free) filtrate were drawn off through the filters without any change in the filtering efficiency during this entire period. The filters were backwashed for 5 seconds with the filtrate twice every hour.

EXAMPLE 2

A working solution obtained from 75 vol. percent of gasoline with aromatic content (as in Example 1) and 25 vol. percent of trioctyl phosphate which contained 0.07 wt. percent of palladium black was used in the hydrogenation step of the anthraquinone process for the production of hydrogen peroxide at an operating temperature of 40° C. 60 m.$^3$/h. of such hydrogenated solution were filtered through porous carbon filters as described in Example 1 having a total filtering area of 130 m.$^2$ (filter efficiency of 0.46 m.$^3$ of filtered liquid per m.$^2$ filter area per hour). The filters were backwashed with the filtrate twice every hour for about 5 seconds. The pressure differential during both the actual filtration and the backwash was 3.5 to 4 atmospheres gauge pressure. The filter efficiency of 0.46 m.$^3$ per hour per m.$^2$ of filter area was maintained over a period of 4 years of continuous operation.

With another model solution ($D_4^{20}$=0.96, viscosity at 20° C.=6.5 cp.) mixture of about 60 vol. percent of dimethyl naphthalene and 40 vol. percent of trioctyl phosphate in which 240 g./l. of palladium black of a particle size between 0.01 and 1 m$\mu$ were suspended, the filter efficiency was 0.45 m.$^3$ of filtered liquid per m.$^2$ filter area per hour. During a test period of 3 years, no change in the filter efficiency entered.

We claim:
1. In a process for the separation of a suspended finely divided unsupported noble metal catalyst having a primary particle size of between about 0.01 and 1 m$\mu$ from an organic liquid containing said suspended catalyst, the improvement which comprises passing said organic liquid through a porous carbon filter having a maximum pore size of 15 m$\mu$ to filter off said suspended catalyst.

2. The process of claim 1 in which said porous carbon filter is formed from carbon with the aid of an organic bonding agent and baking.

3. The process of claim 1 in which said noble metal catalyst is palladium black.

4. The process of claim 1 in which the organic liquid containing the suspended noble metal catalyst filtered is the hydrogenated working solution of the anthraquinone process for the production of hydrogen peroxide.

5. The process of claim 2 in which said porous carbon filter has a free pore volume of at least about 15%.

6. The process of claim 2 in which said porous carbon filter has a free pore volume of at least about 30%.

References Cited

UNITED STATES PATENTS

| | | | |
|---|---|---|---|
| 1,968,847 | 8/1934 | Morrell | 210—502 X |
| 2,786,047 | 3/1957 | Jones et al. | 210—65 X |

OTHER REFERENCES

The Condensed Chemical Dictionary, 6th ed., Reinhold Pub. Co., 1961, p. 589.

Hackh's Chemical Dictionary, 3rd ed., McGraw-Hill Book Co., N.Y., 1944, p. 612.

REUBEN FRIEDMAN, *Primary Examiner.*

J. L. DE CESARE, *Assistant Examiner.*

U.S. Cl. X.R.

210—496, 502